(12) United States Patent
Rejer et al.

(10) Patent No.: US 12,187,213 B2
(45) Date of Patent: Jan. 7, 2025

(54) ENHANCED FRONT IMPACT DETECTION UTILIZING PRESSURE TUBE SENSOR

(71) Applicant: ZF FRIEDRICHSHAFEN AG, Friedrichshafen (DE)

(72) Inventors: Maciej Rejer, Friedrichshafen (DE); Andreas Fleckner, Friedrichshafen (DE); Pawel Koziel, Friedrichshafen (DE); Charles A. Bartlett, Commerce Township, MI (US); Harald Pfriender, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 232 days.

(21) Appl. No.: 17/795,578

(22) PCT Filed: Mar. 19, 2020

(86) PCT No.: PCT/IB2020/052544
§ 371 (c)(1),
(2) Date: Jul. 27, 2022

(87) PCT Pub. No.: WO2021/186220
PCT Pub. Date: Sep. 23, 2021

(65) Prior Publication Data
US 2023/0140943 A1 May 11, 2023

(51) Int. Cl.
*B60R 21/0136* (2006.01)
*B60R 21/205* (2011.01)
(Continued)

(52) U.S. Cl.
CPC ........ *B60R 21/0136* (2013.01); *B60R 21/205* (2013.01); *G01L 13/00* (2013.01);
(Continued)

(58) Field of Classification Search
CPC .............. B60R 21/0136; B60R 21/205; B60R 21/0132; B60R 21/36; B60R 21/0134; G01L 13/00; G01L 19/0092
See application file for complete search history.

(56) References Cited

U.S. PATENT DOCUMENTS

| | | |
|---|---|---|
| 2002/0147533 A1 | 10/2002 | Foo et al. |
| 2006/0255575 A1 | 11/2006 | Foo et al. |

(Continued)

FOREIGN PATENT DOCUMENTS

WO 2010025206 3/2010

*Primary Examiner* — George C Jin
(74) *Attorney, Agent, or Firm* — Tarolli, Sundheim, Covell & Tummino LLP

(57) ABSTRACT

A method for controlling an actuatable safety device (110) for helping to protect a vehicle occupant includes sensing left-front and right-front pressure values via a pressure tube sensor (18). The method also includes executing pressure tube metrics that evaluate the left-front and right-front pressure values and selecting switched crash thresholds in response to the pressure tube metrics. The method also includes sensing vehicle acceleration parameters (99) and executing one or more crash metrics that evaluate the vehicle acceleration parameters to determine whether the switched crash thresholds are exceeded. The method further includes controlling deployment of the actuatable safety device (110) in response to determining that the switched crash thresholds are exceeded. A vehicle safety system (100) implements the method.

21 Claims, 7 Drawing Sheets

(51) Int. Cl.
  *G01L 13/00*    (2006.01)
  *G01L 19/00*    (2006.01)
  *B60R 21/01*    (2006.01)

(52) U.S. Cl.
  CPC .................... *G01L 19/0092* (2013.01); *B60R 2021/01265* (2013.01); *B60R 2021/01286* (2013.01)

(56) References Cited

U.S. PATENT DOCUMENTS

| | | | |
|---|---|---|---|
| 2007/0090931 A1* | 4/2007 | Hawes | B60R 21/0136 340/436 |
| 2011/0282553 A1 | 11/2011 | Foo et al. | |
| 2012/0271509 A1* | 10/2012 | Nehls | B60R 21/0136 701/34.4 |
| 2015/0203068 A1 | 7/2015 | Foo et al. | |
| 2015/0291122 A1* | 10/2015 | Seo | B60R 19/483 701/45 |
| 2015/0314744 A1 | 11/2015 | Lang et al. | |
| 2019/0016286 A1* | 1/2019 | Bartlett | G07C 5/085 |
| 2020/0262385 A1* | 8/2020 | Lang | B60R 21/0132 |
| 2020/0290539 A1* | 9/2020 | Koenig | B60R 21/0136 |
| 2021/0245693 A1* | 8/2021 | Lee | B60R 21/0132 |

* cited by examiner

ENHANCED FRONT IMPACT DETECTION UTILIZING PRESSURE TUBE SENSOR

CROSS REFERENCES TO RELATED APPLICATIONS

This application filed under 35 U.S.C § 371 is a national phase application of International Application Serial Number PCT/IB2020/052544, filed Mar. 19, 2020, the subject matter of which are incorporated herein by reference in its entirety.

TECHNICAL FIELD

The present invention relates to a method and apparatus for controlling a vehicle actuatable occupant protection device and, in particular, to a method and apparatus for detecting vehicle front impacts events and discriminating among several types of vehicle front impact events. The method and apparatus utilizes a front pressure tube sensor to enhance the detection and discrimination of these front impact events.

BACKGROUND

Actuatable vehicle occupant protection systems, or "vehicle safety systems," include actuatable restraints, such as actuatable seatbelt retractors and airbags. These vehicle safety systems include a plurality of event sensors, such as accelerometers, and an electronic control unit, referred to herein as an airbag control unit ("ACU"). The ACU monitors signals provided by the sensors and makes determinations on whether to actuate the actuatable restraints.

For vehicle safety systems, it is desirable to discriminate amongst the various collision or impact events ("crash events") in which a vehicle might be involved. Recognizing that real-life crash scenarios are limitless, crash tests have been developed to mimic the most common real-life crash scenarios in terms of crash type and crash severity. If the vehicle safety system can identify and discriminate between the various crash tests and actuate the actuatable restraints in response thereto, then the vehicle safety system will also perform in the real-life crash event.

Crash tests can involve a variety of impact types, such as frontal impacts, side impacts, offset impacts, and oblique or angular impacts, each of which is carried out at a prescribed velocity. Vehicle crash events can involve various impacting structures, such as a pole or deformable barrier, the latter of which can be stationary or moving. Each of these impacting structures are specifically designed to represent structures encountered in the real-life crash scenarios. For example, the pole crash test, can implement a pole designed to represent the typical telephone or traffic signal pole, and the deformable barrier can be designed to represent another vehicle involved in the collision.

Vehicle safety systems can be configured or adapted to discriminate those crash events for which actuation of the actuatable restraints is desired from those crash events for which actuation of the actuatable restraints is not desired. Crash discrimination therefore entails determining the crash type, e.g., frontal, side, offset, oblique angular, etc. Crash discrimination also entails determining the impacting structure type, e.g., pole or deformable barrier. Crash discrimination also entails determining the crash severity. Crash discrimination further entails misuse conditions, such as vehicle off-road driving, and other conditions, such as animal impacts, where vehicle impacts may be detected, but actuation of the actuatable restraints is not warranted.

Vehicle safety systems therefore must determine whether an event is a must-fire (MF) event, a no-fire (NF) event, or a misuse event. Must fire events are those crash events for which airbag deployment must take place. It is for these crash events that further discrimination is desirable, because this further classification allows for tailoring the airbag deployment for the particular classified event. No-fire events are those whose magnitude does not warrant airbag deployment. Misuse events are events where the vehicle is being used in a non-traditional manner, such as off-road driving, and airbag deployment is not desired, even though the magnitude of the detected crash event may dictate otherwise.

The National Highway Traffic Safety Administration ("NHTSA") is a U.S. government agency that governs vehicle safety and assesses new car safety via its New Car Assessment Program (US-NCAP). Through US-NCAP, NHTSA establishes crash tests to establish the crashworthiness of new vehicles and rates those vehicles with a star rating, with a five-star rating being the best. The standards for these tests are issued as Federal Motor Vehicle Safety Standards (FMVSS), which NHTSA issues to implement safety laws passed by Congress. The FMVSS standards describe in detail the precise test procedures used to determine the US-NCAP ratings, which are determined from metrics measured for crash test dummies positioned in the vehicle at the time of the test.

The U.S. is not the only country to have its own new car assessment program. Other countries, such as China, Japan, and Australia, and other groups of countries, such as Europe and Latin America, have their own NCAP. While the new car ratings issued by these bodies are similar, some utilize crash tests with slightly different methods.

Over the years, safety standards are modified and updated to "push the envelope" when it comes to automotive safety. As a result, in keeping up with the standards, automobile manufacturers are pushed to constantly improve the safety of their products. As the standards become more rigorous, the safety systems adapt and become more complex and capable. Through the evolution of vehicle safety systems, it has been discovered that crash classification is one of the key aspects that helps determine the efficacy of the system. If the safety system can accurately and robustly identify the crash scenario as defined by a safety standard, it can take measures tailored to produce the best results for occupants involved in accidents for which the standard is designed.

While vehicle safety systems have been developed with the ability to discriminate a variety of crash events, there exists a continuing need to further classify and discriminate amongst crash events so that the vehicle safety system can take the appropriate responsive action. Among the crash events for which discrimination can be desired are different types of vehicle frontal impact crash events. A rigid frontal barrier is fixed and non-deformable, representing rigid barriers found on the road, such as concrete barriers.

One particular frontal crash test is a high speed rigid barrier frontal crash test in which the vehicle impacts the rigid barrier at 56 kph (approximately 35 mph). Because this test involves a vehicle moving at a high rate of speed into a rigid, non-deformable barrier, the crash event develops quickly. Therefore, it is desirable to discriminate this crash scenario as soon as possible in order to allow as much time as possible for the safety system to deploy the necessary safety devices.

SUMMARY

A method for controlling an actuatable safety device for helping to protect a vehicle occupant includes sensing left-front and right-front pressure values via a pressure tube sensor. The method also includes executing pressure tube metrics that evaluate the left-front and right-front pressure values and selecting switched crash thresholds in response to the pressure tube metrics. The method also includes sensing vehicle acceleration parameters and executing one or more crash metrics that evaluate the vehicle acceleration parameters to determine whether the switched crash thresholds are exceeded. The method further includes controlling deployment of the actuatable safety device in response to determining that the switched crash thresholds are exceeded.

According to one aspect, the switched crash thresholds can include no-fire thresholds and misuse boxes.

According to one aspect, alone or in combination with any other aspect, the pressure tube metrics can include at least one of pressure tube sensor differential discrimination metrics and pressure tube sensor asymmetric split metrics.

According to one aspect, alone or in combination with any other aspect, the pressure tube sensor differential discrimination metrics can evaluate a rate of change in at least one of the left-front and right-front pressure values.

According to one aspect, alone or in combination with any other aspect, the pressure tube sensor differential discrimination metric can evaluate a front pressure differential moving average absolute value against an upfront sensor acceleration moving average.

According to one aspect, alone or in combination with any other aspect, the pressure tube asymmetric split metrics can evaluate a phase shift in the left-front and right-front pressure values to determine whether a front impact is symmetric, asymmetric-left, or asymmetric-right.

According to one aspect, alone or in combination with any other aspect, the pressure tube asymmetric split metrics can evaluate a front-left pressure moving average against a front-right pressure moving average.

According to one aspect, alone or in combination with any other aspect, selecting switched crash thresholds in response to the pressure tube metrics can include selecting the switched crash thresholds in response to at least one of:

The pressure tube sensor differential discrimination metric for either of the left-front and right-front pressure values exceeding an OR threshold.

The pressure tube sensor differential discrimination metric for both the left-front and right-front pressure values exceeding an AND threshold, wherein the AND threshold has a magnitude that is less than a magnitude of the OR threshold.

The pressure tube sensor differential discrimination metric for the left-front pressure value exceeding an OR ASYM threshold and the pressure tube asymmetric split metric indicates an asymmetric-left front impact, The pressure tube sensor differential discrimination metric for the right-front pressure value exceeding an OR ASYM threshold and the pressure tube asymmetric split metric indicates an asymmetric-right front impact.

According to one aspect, alone or in combination with any other aspect, the method can also include determining the occurrence of a high speed rigid barrier collision in response to:

Selecting switched crash thresholds in response to the pressure tube metrics.

The pressure tube sensor differential discrimination metric for both the left-front and right-front pressure values exceeding a $2^{nd}$ AND threshold.

The pressure tube asymmetric split metric indicates an symmetric front impact.

According to one aspect, alone or in combination with any other aspect, the vehicle is an electric vehicle, hybrid vehicle or vehicle equipped with high voltage installation and the method further can include deactivating a high-voltage connection in response to:

The pressure tube sensor differential discrimination metric for both the left-front and right-front pressure values exceeding an AND HV threshold.

A long moving average metric for both the left-front and right-front pressure values exceeds a FLAT threshold.

At least one of a left low speed rigid barrier suppression metric and a right low speed rigid barrier suppression metric exceeds an HV threshold.

According to one aspect, alone or in combination with any other aspect, the left low speed rigid barrier suppression metric can include a left pressure tube sensor differential discrimination metric that evaluates a front-left pressure differential moving average absolute value against one of a CCU X-axis acceleration moving average and an acceleration value obtained from a left up-front acceleration sensor. The right low speed rigid barrier suppression metric can include a right pressure tube sensor differential discrimination metric that evaluates a front-right pressure differential moving average absolute value against one of a CCU X-axis acceleration moving average and an acceleration value obtained from a right up-front acceleration sensor.

According to one aspect, alone or in combination with any other aspect, a vehicle safety system can include one or more vehicle safety devices and a controller configured to execute the method as set forth above to actuate one or more vehicle safety devices.

According to one aspect, alone or in combination with any other aspect, the vehicle safety system can include a pressure tube sensor (PTS) configured to be mounted at the front of the vehicle. The vehicle safety system can also include an airbag control unit (ACU) configured to be mounted in an instrument panel of the vehicle. The controller can be implemented in the airbag control unit, and the pressure tube sensor can be configured to communicate with the ACU.

According to one aspect, alone or in combination with any other aspect, the vehicle safety system can include a left upfront sensor (LT_UFS) configured to be mounted at a front-left corner of the vehicle, and a right upfront sensor (RT_UFS) configured to be mounted at a front-right corner of the vehicle. The left upfront sensor and right upfront sensor can be configured to communicate with the ACU.

According to one aspect, alone or in combination with any other aspect, the one or more vehicle safety devices can include at least one of a frontal airbag and a seatbelt pretensioner.

DRAWINGS

The foregoing and other features and advantages of the invention will become apparent to one skilled in the art upon consideration of the following description of the invention and the accompanying drawings in which.

DESCRIPTION

Vehicle Safety System

Figure 1:
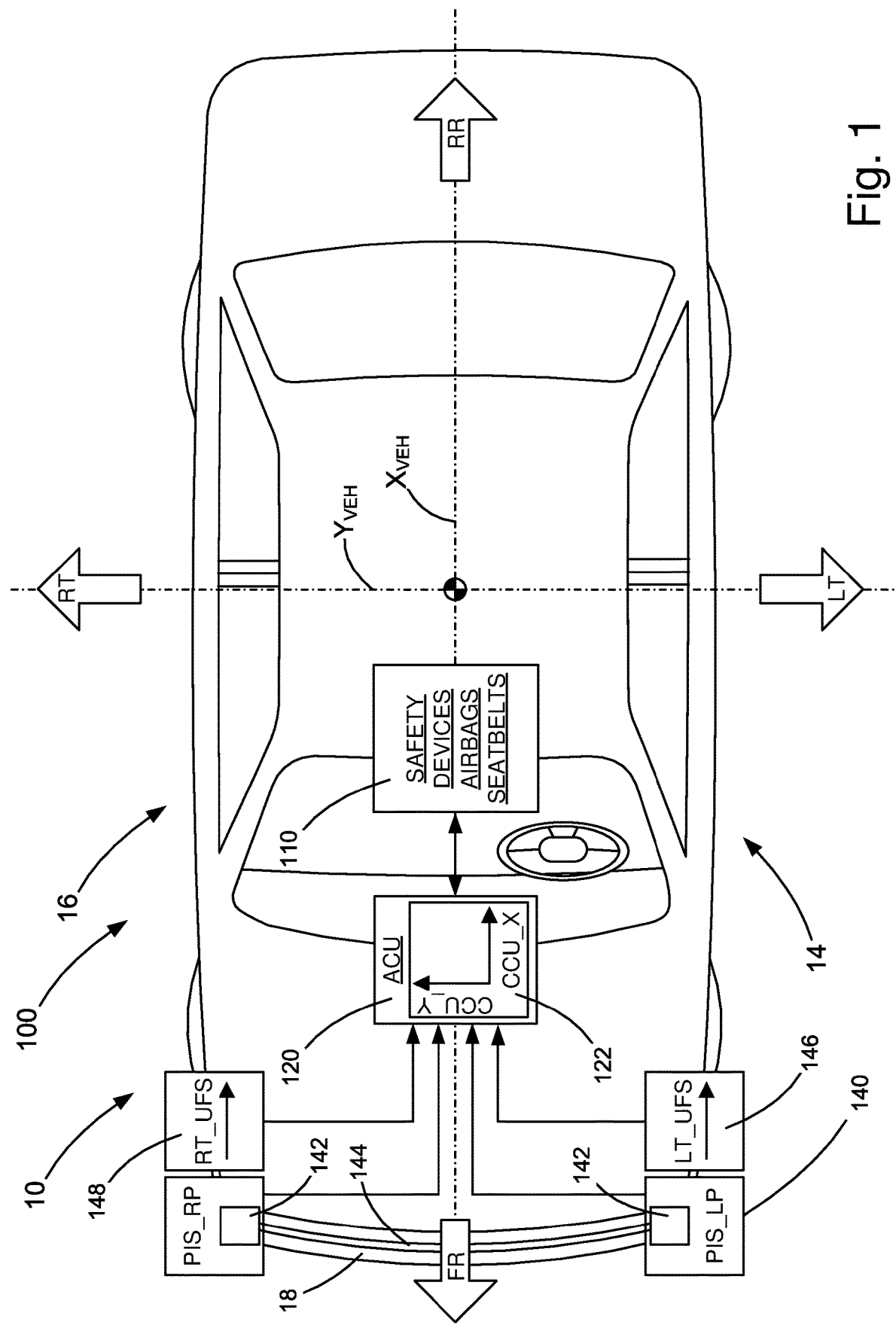
FIG. 1 is a schematic diagram illustrating a vehicle safety system, according to one aspect of the invention.

Referring to FIG. 1, a vehicle 10 includes a vehicle safety system 100. The safety system 100 can include a plurality of actuatable vehicle safety devices, which are shown schematically at 110. The actuatable safety devices 110 can, for example, include airbags (e.g., frontal airbags, side impact airbags, curtain airbags, etc.) and seatbelts, e.g., seatbelt pretensioners.

The system 100 further includes a plurality of vehicle-based sensors operatively connected to an airbag control unit ("ACU") 120. The ACU 120 is typically mounted between front seats of the vehicle 10, but could be mounted at alternative locations. The protection devices 110 also are operatively connected to the ACU 120. The vehicle-based sensors are used for sensing vehicle conditions and crash indications. Since the vehicle-based sensors provide analog signals, the ACU 120 performs analog-to-digital (A/D) conversions of the sensor signals. The ACU 120 includes a controller that is programmed to receive the digitized signals from the vehicle-based sensors, to determine vehicle conditions, such as crash conditions, based on the signals from the vehicle-based sensors, and to control actuation of the safety devices 110 in response to the determined vehicle conditions.

The vehicle-based sensors include an ACU sensor 122, which is integrated into the ACU 120. The ACU sensor 122 includes a two-axis accelerometer for measuring vehicle accelerations in the direction of the X-axis ($X_{VEH}$) and the Y-axis ($Y_{VEH}$) and determining values indicative of these sensed vehicle accelerations. CCU_X is a value indicative of vehicle acceleration measured in the direction of the vehicle X-axis at the location of the ACU 120. CCU_Y is a value indicative of vehicle acceleration measured in the direction of the vehicle Y-axis at the location of the ACU 120. The ACU 120 can use these signals to determine crashes and to discriminate amongst different crash types.

The vehicle-based sensors also include a front pressure tube sensor 140, referred to herein as the PTS. The PTS 140 is mounted at the front end of the vehicle behind the fascia of the front vehicle bumper 18. The PTS 140 includes two pressure transducers 142 fluidly connected to a pressure tube 144. The pressure transducers 142 are mounted at front-left (FR_LT) and front-right (FR_RT) corners, respectively, of the vehicle 10.

The pressure tube 144 is constructed of a flexible, deformable material, such as a vinyl or poly-vinyl chloride (PVC) material. Front impacts with the vehicle deform the pressure tube 144, causing an increase in pressure inside the tube. The pressure transducers 142 sense the change in pressure and produce left and right pressure signals (PIS_LP and PIS_RP, respectively) that correspond to the pressure change. The PIS_LP and PIS_RP signals are sent to the ACU 120, which can use the pressure signals to help sense or determine the occurrence of front impacts/crashes with the vehicle 10 and to discriminate amongst different types of front impacts/crashes based on the pressure signals.

The vehicle-based sensors can also include a left upfront sensor 146 that is mounted at or near the front-left (FR_LT) corner of the vehicle 10 and a right upfront sensor 148 that is mounted at or near the front-right (FR_RT) corner of the vehicle. The upfront sensors 146, 148 are accelerometer sensors that measure vehicle accelerations in the direction of the X-axis. The upfront sensors 146, 148 are operable to produce left and right upfront X-axis acceleration signals LT_UFS and RT_UFS, respectively, which are provided to the ACU 120. The ACU 120 can use these signals to determine crashes and to discriminate amongst different crash types.

Signal Conditioning

Figure 2:
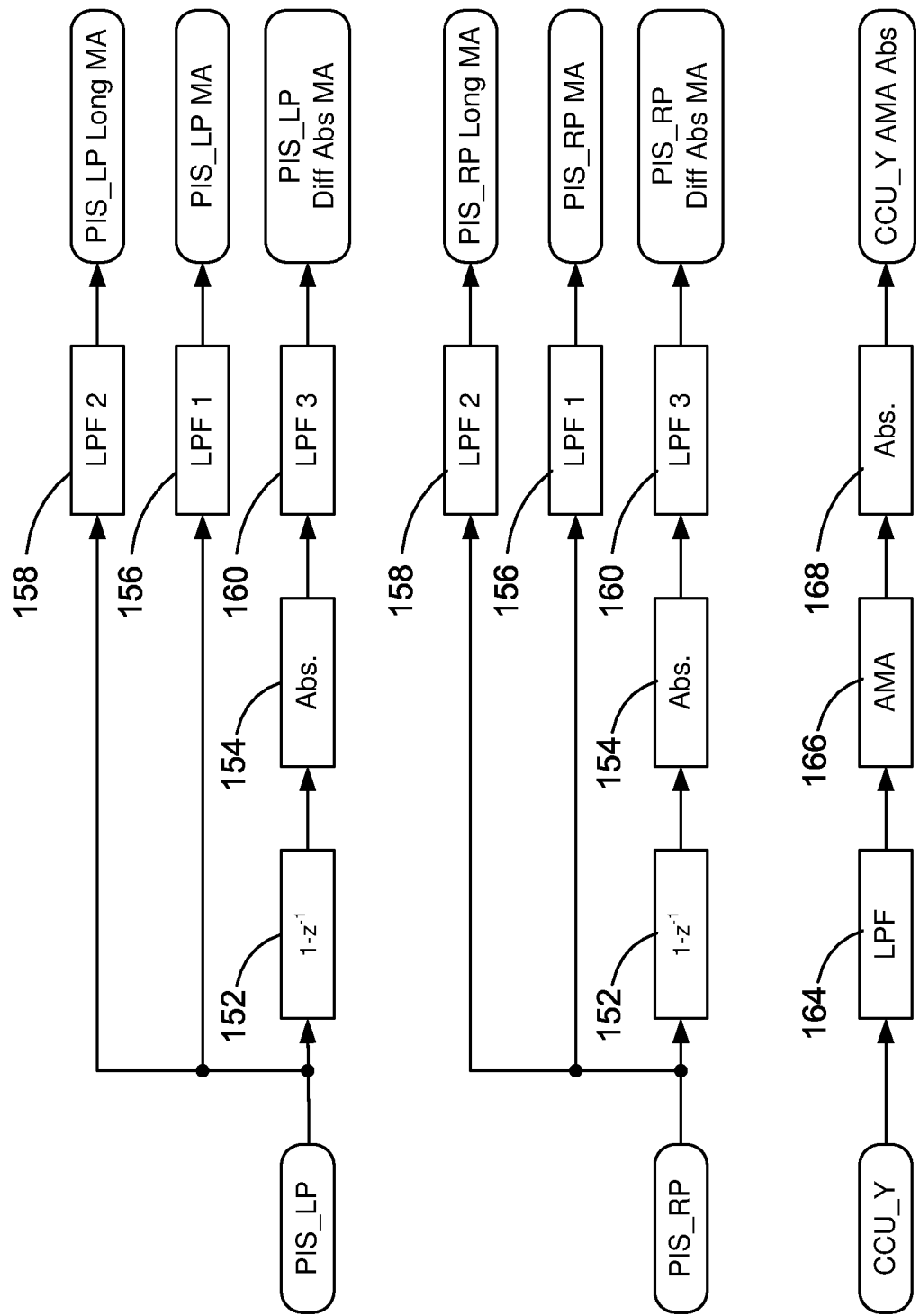
FIG. 2 is a schematic block diagram depicting signal conditioning performed by the vehicle safety system.

FIG. 2 illustrates block diagrams showing the signal conditioning that some of the sensor data undergoes prior to being implemented in the metrics and algorithms disclosed herein. For example the pressure signals (PIS_LP, PIS_RP) from the pressure transducers 142 of the pressure tube sensor 140 are conditioned via several different functions to produce three different conditioned signals that can be implemented by the metrics and algorithms disclosed herein. Additionally, the central Y-axis acceleration (CCU_Y) from the ACU 120 are conditioned via several different functions to produce a conditioned signal implemented by the metrics and algorithms disclosed herein.

As shown in FIG. 2, the pressure signals PIS_LP, PIS_RP can undergo a difference calculation ($1-z^{-1}$ block 152) to determine the difference between current and previous data samples. An absolute value determination (Abs block 154) produces a positive value for the sensor signal. Low-pass filter (LPF) calculations with different window sizes can be used to smooth the pressure signals.

For example, in FIG. 2, there are three LPF blocks, each of which have different window size. LPF 1 block 156 calculates a moving average over a predetermined window size, and produces moving average values PIS_LP MA and PIS_RP MA. LPF 2 block 158 calculates a moving average with a wider window size and produces long moving average values PIS_LP MA Long and PIS_RP MA Long. LPF 3 block 160 calculates a moving average with a shorter window size. Because it receives its input from $1-z^{-1}$ block 152 and Abs block 154, short MA block 160 produces moving average values PIS_LP Diff Abs MA and PIS_RP Diff Abs MA. The sample times for each of the MA blocks 156, 158, 160 can be tunable.

Additionally, as shown in FIG. 2, the acceleration signal CCU_Y undergoes low pass filtering (LPF block 164), which can be used to eliminate high frequency noise from the CCU_Y acceleration signal. An acceleration moving average (AMA block 166) calculation with a tunable window size can be used to smooth the filtered acceleration signal. An absolute value determination (Abs block 168) produces a positive value for the conditioned signal CCU_Y AMA Abs.

Pressure Tube Data and Corresponding Metrics

The pressure tube sensor 140 produces pressure data that the ACU 120 can interpret to make early/quick determinations regarding front impacts with the vehicle 10. Because the pressure transducers 142 are positioned at opposite ends of the pressure tube 144, certain characteristics of front impacts with the vehicle can be determined by evaluating the pressure data received from the transducers over time and comparing that data with other data, such as acceleration data (ACU_X, ACU_Y) gathered from the ACU 120.

Figure 3A:
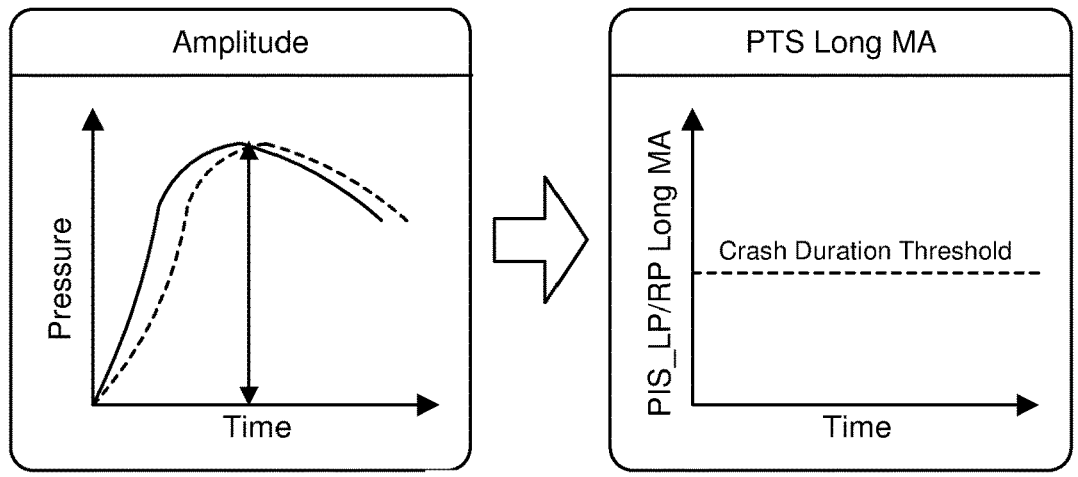
FIGS. 3A-3C illustrate pressure tube sensor metrics that can be implemented by the vehicle safety system.
Figure 3B:
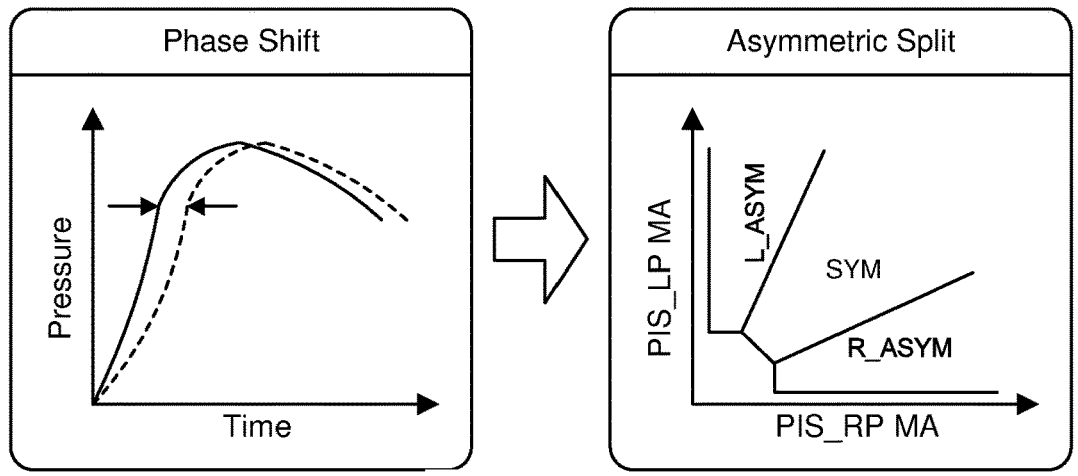
Figure 3C:
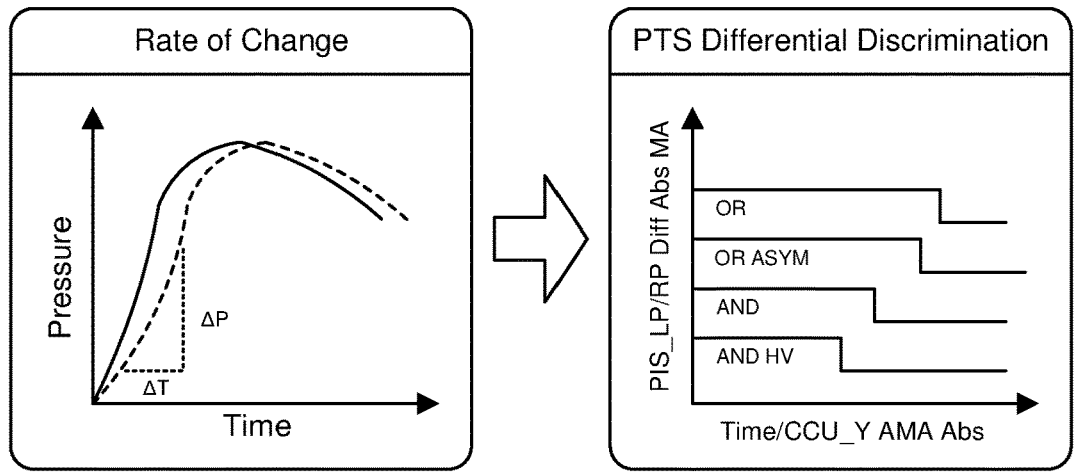

This is illustrated in FIGS. 3A-3C, each of which shows example plots of pressure vs. time for both the left and right pressure transducer 142 in response to a front impact. Which of the pressure transducers (i.e., left or right) is represented by which of the plots (i.e., solid or dashed) is not important in FIGS. 3A-3C. FIGS. 3A-3C also illustrate example implementations of metrics that can be associated with each of the pressure vs. time plots.

Referring to the plot on the left in FIG. 3A, one characteristic that can be determined by comparing pressure signals over time for the left and right pressure transducers 142 is amplitude. The amplitude of the pressure signals (PIS_RP, PIS_LP) is indicative of the magnitude or severity of the sensed frontal impact. Because frontal impacts produce high magnitude pressure rises in the pressure tube 144, sensor clipping can result from all types of events, including must-fire, no-fire, and misuse events. Because of this, the amplitude of the pressure signals (PIS_RP, PIS_LP) does not lend well to crash determination discrimination per se. However, the moving average (MA) of the pressure signals can be used to discriminate short frontal impacts from frontal impacts of a longer duration. An example implementation of a metric associated with this amplitude pressure vs. time plot is shown on the right in FIG. 3A.

As shown in the metric illustrated on the right in FIG. 3A, frontal crashes of a threshold magnitude and duration can be discriminated using the long moving average of the pressure signal (PIS_LP Long MA, PIS_RP Long MA). The crash duration threshold, shown by the dashed line, represents the magnitude, i.e., the amplitude, of the long MA signal that must be maintained over time in order to discriminate the frontal crash condition. The requisite duration can be tunable (e.g., via the moving average window) so that the discriminated frontal crash conditions can match predetermined criteria.

Referring to the plot on the left in FIG. 3B, another characteristic that can be determined by comparing pressure signals over time for the left and right pressure transducers 142 is the phase shift between the signals. Frontal impacts acting on the pressure tube sensor 140 generate a pressure wave that propagates through the pressure tube 144. If the impact is centered on the vehicle 10 and, thus, the pressure tube sensor 140, the pressure wave will travel the tube and reach the pressure transducers 142 at the same time. In this case, the pressure signals (PIS_RP, PIS_LP) will be concurrent, i.e., they will overlie each other in the pressure vs. time plot on the left in FIG. 3B. If this were the case, there would be no phase shift between the signals.

If, however, the impact is shifted to one side or another of the vehicle 10, the pressure rise and the resulting pressure signals will be phase shifted due to the differential in time that the pressure wave takes to reach the transducers 142. This is the case in the example plot illustrated on the left in FIG. 3B, in which the magnitude of the phase shift is illustrated generally by the double arrows. Accordingly, it will be appreciated that an impact that occurs toward the left side of the vehicle 10 will produce a phase shift with the left pressure signal occurring first in time, followed by the right pressure signal. Conversely, it will be appreciated that an impact that occurs toward the right side of the vehicle 10 will produce a phase shift with the right pressure signal occurring first in time, followed by the left pressure signal. The amount of shift between the signals can therefore be indicative of the degree of offset between the vehicle and the colliding vehicle/object. An example implementation of a metric associated with this phase shift pressure vs. time plot is shown on the right in FIG. 3B.

As shown in the asymmetric split metric illustrated on the right in FIG. 3B, the phase shift between the pressure transducers 142 can be used to identify the symmetry of a front collision. A symmetrical front collision have the impacting object centered on the vehicle, and left/right asymmetric front collisions have the impacting object shifted left or right on the vehicle. The asymmetric split metric utilizes moving averages of the left and right pressures (PIS_LP MA, PIS_RP MA) to make these determinations.

The asymmetric split metric of FIG. 3B implements regions for determining the symmetry of frontal crashes. In FIG. 3B, these regions include a symmetric (SYM) region, a left asymmetric (L_ASYM) region, and a right asymmetric (R_ASYM) region. Comparing PIS_LP MA and PIS_RP MA in the asymmetric split metric of FIG. 3B, if the metric falls in the SYM region, the frontal collision is determined to be symmetric. If the metric falls in the L_ASYM region, the frontal collision is determined to be left asymmetric. If the metric falls in the R_ASYM region, the frontal collision is determined to be right asymmetric. Through this, the asymmetric split metric can discriminate between symmetric, left asymmetric, and right asymmetric frontal collisions, and this determination can be used to further discriminate frontal vehicle collisions.

Because frontal impacts produce high magnitude pressure rises in the pressure tube 144, sensor clipping can result from all types of events, including must-fire (MF), no-fire (NF), and misuse events. Because of this, the amplitude of the pressure signals (PIS_RP, PIS_LP) itself does not lend well to crash discrimination. The rate of change in the pressure signals can, however, differ in the case of must-fire vs. no-fire front impact events. The rate of change can, therefore, be used to discriminate between those events.

Referring to the plot on the left in FIG. 3C, the pressure signals can be compared over time to determine the rate of change of the pressure signals (PIS_RP, PIS_LP) from the pressure transducers 142. The pressure signal rate of change (before clipping) can be indicative of the dynamics of the front impact. The steeper the plot, i.e., the higher the pressure rate of change, the greater the magnitude of the front impact. Accordingly, the pressure rate of change can be used to produce a metric capable of discriminating must-fire (MF) events from no-fire (NF) events. An example implementation of a metric associated with this rate of change pressure vs. time plot is shown on the right in FIG. 3C.

As shown on the right in FIG. 3C, the PTS differential discrimination metric implements various thresholds, indicated by solid lines, for discriminating must-fire events from no-fire events. The different thresholds illustrated in FIG. 3C are used to discriminate particular events, so each can have a threshold magnitude that differs from the others. For example, the OR threshold can have a magnitude that is less than the AND threshold. The threshold indications of the PTS differential discrimination metric are implemented in control algorithms (described below) that are operative to make various determinations regarding the vehicle.

The PTS differential discrimination metric utilizes the PIS_LP Diff Abs MA and PIS_RP Diff Abs MA signals which, as described previously is a differential between current and previous pressure samples (see the $1-z^{-1}$ block 152 of FIG. 2). The differential signals PIS_LP Diff Abs MA and PIS_RP Diff Abs MA crossing these thresholds determine conditions that warrant a must-fire event if other conditions related to the event are satisfied. The Boolean logic associated with these determinations is described below in the description of the PTS threshold switching algorithms.

Determination and Comparison Function

Figure 4:
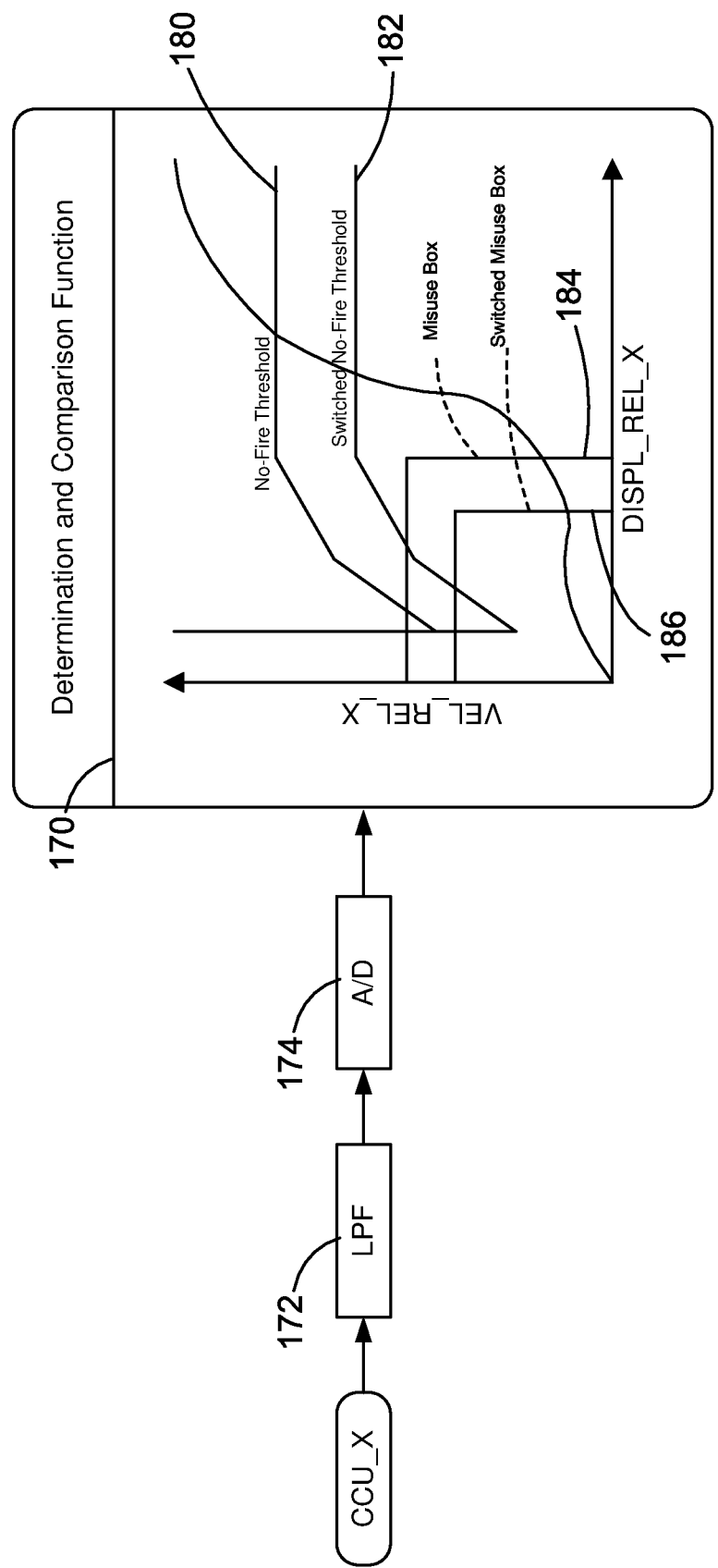
FIG. 4 illustrates a Determination and comparison function that can be implemented by the vehicle safety system.

FIG. 4 illustrates a determination and comparison function 170 that is implemented in the ACU 120. The determination and comparison function 170 makes a fire/no-fire determination in response to metrics associated with vehicle collisions. A "fire" determination is a determination that collision metrics have exceeded a threshold for actuating or "firing" the vehicle safety devices 110. A "no-fire" determination is a determination that collision metrics have not exceeded the firing threshold and, thus, firing the safety devices 110 is not necessary.

As shown in FIG. 4, an acceleration signal ACU_X (provided by the ACU sensor 122) has characteristics (e.g., frequency and amplitude) indicative of the vehicle's acceleration in a direction substantially parallel to the X-axis of the vehicle 12. The acceleration signal ACU_X is provided to a low-pass-filter (LPF) function 172 implemented in the ACU 120. The LPF function 172 filters the acceleration signal ACU_X to eliminate extraneous signal components, such as frequencies resulting from extraneous vehicle operating events and/or from road noise. The signal components removed through filtering are those determined not to be useful in discriminating 1) whether a vehicle crash event is occurring and 2) whether a detected vehicle crash event is one for which actuation of the vehicle safety devices 110 is desired, i.e., a fire event.

Vehicle architectures vary from model to model, so the signal components removed through filtering can also vary from model to model. Empirical testing or calculation may be used to determine the signal components useful for discrimination of a vehicle crash condition in a particular vehicle of interest and/or determining whether a detected vehicle crash event is one for which actuation of the vehicle safety devices 110 is desired. It is those signal components that are indicative of a vehicle crash condition and/or that are useful in determining whether a detected vehicle crash event is one for which actuation of the vehicle safety devices 110 is desired that the LPF function 172 outputs for further processing.

The filtered output signal from the LPF function 172 is provided to an analog-to-digital (A/D) converter function 174 implemented in the ACU 120. The A/D converter function 174 converts the analog filtered crash acceleration signal to a digital signal. The output of the A/D converter function 174 may be filtered with an additional filter function (not shown) to eliminate small drifts and offsets associated with the A/D conversion. This additional filter function can be digitally implemented within the ACU 120.

A determination and comparison function 170 implemented in the ACU 120 determines two crash metric values, VEL_REL_X and DISPL_REL_X, from the filtered crash acceleration signal ACU_X. More specifically, the determination and comparison function 170 determines VEL_REL_X, which is velocity in a direction substantially parallel to the X-axis, by integrating the filtered crash acceleration signal ACU_X. The determination and comparison function 170 also determines DISP REL X, which is displacement in a direction substantially parallel to the X-axis, by double integrating the filtered crash acceleration signal ACU_X.

In one example implementation, the crash displacement value and crash velocity value can be determined using a virtual crash sensing process fully described in U.S. Pat. No. 6,156,539 to Foo et al. and U.S. Pat. No. 6,036,225 to Foo et al. using a spring mass model of the occupant to account for spring forces and damping forces. A detailed explanation of a spring-mass model can be found in U.S. Pat. No. 5,935,152 to Foo et al. The determination and comparison function 170 compares the value VEL_REL_X against at least one crash discrimination threshold, which comparison is used to discriminate whether a crash event is occurring.

In accordance with the example implementation of the invention illustrated in FIG. 4, the determination and comparison function 170 compares the VEL_REL_X value as a function of the DISPL_REL_X value against a discrimination threshold, which is identified in FIG. 4 as a no-fire threshold 180. If the VEL_REL_X as a function of DISPL_REL_X exceeds the no-fire threshold 180, a "fire" or "actuate" condition for the safety devices 110 is determined. The determination and comparison function 170 can include a latch function (not shown) that time latches for a predetermined period a determination that the fire/actuate condition has been met.

As part of comparing the VEL_REL_X value as a function of the DISPL_REL_X value against the no-fire threshold, the determination and comparison function 170 also ensures that the VEL_REL_X value lies outside of a safing immunity or misuse box 184 before initiating any comparison. The purpose of the misuse box 184 is to filter misuse events and to prevent actuation of the safety devices 110 when crash velocity and/or crash displacement values are within the misuse box values. Misuse events include hammer blows, road bumps, door slams, and other events, which produce output signals from crash acceleration sensors that are not the result of vehicle crash events.

The misuse box 184 is represented by values of determined crash velocity and crash displacement below which the safety devices 110 should not be actuated. It is only after the determined crash velocity VEL_REL_X values and/or crash displacement DISPL_REL_X values exceed the velocities and displacements represented by the misuse box 184, i.e., are outside of the misuse box, that actuation of the safety devices 110 is normally permitted in response to crash metric determinations.

The misuse box 184 defines an area bounded by predetermined upper limit values of VEL_REL_X and DISPL_REL_X. When the determined value of VEL_REL_X is within the area of the misuse box 184, the safing function is OFF or at a digital LOW condition and, therefore, actuation of the safety devices 110 is inhibited and cannot occur. If the value VEL_REL_X is outside of the misuse box 184, the safing function is ON or at a digital HIGH condition and, therefore, the safety devices 110 can be actuated.

If the value VEL_REL_X is outside the misuse box 184 and then enters or re-enters the misuse box, the time period that the safing function is or remains ON can be extended or enhanced. This is referred to as a latched time period. Also, even though only one misuse box is shown in FIG. 4, each no-fire threshold can have an associated misuse box.

The no-fire threshold 180 implemented by the determination and comparison function 170 can be fixed or variable. Additionally, the determination and comparison function 170 can include more than one no-fire threshold. Multiple no-fire thresholds can be used to provide different no-fire thresholds for different safety devices. For example, one no-fire threshold can be used for airbags, and a different no-fire threshold can be used for seatbelt pretensioners. Additionally or alternatively, multiple no-fire thresholds can be selected or "switched" based on conditions sensed and/or determined from other vehicle safety sensors/systems. In this manner, the no-fire threshold can be further tailored to sensed vehicle conditions at the time of the vehicle crash.

PTS Threshold Switching Algorithms

Utilizing the metrics described above in reference to FIGS. 3A-3C, the PTS pressure data obtained from the pressure tube sensor 140 can allow for early and quick discrimination of frontal crash scenarios. This early and quick discrimination allows for switching, i.e., lowering, the no-fire threshold and misuse box of the determination and comparison function 170 (FIG. 4) so that the determination and comparison function can respond quicker to certain discriminated frontal crashes. An example implementation of these switched thresholds is illustrated in FIG. 4.

As shown in FIG. 4, in addition to the no-fire threshold 180, the determination and comparison function 170 also includes a switched no-fire threshold 182. The switched no-fire threshold 182 is a no-fire threshold in which the magnitude of the metric required to produce a fire condition is reduced from that of the unswitched no-fire threshold 180. The determination and comparison function 170 implements the switched no-fire threshold 182 in response to sensed vehicle conditions at the time of a vehicle crash. In the absence of those sensed vehicle conditions, the determination and comparison function 170 implements the no-fire threshold 180.

Also, in addition to the misuse box 184, the determination and comparison function 170 of FIG. 4 also includes a switched misuse box 186. The switched misuse box 186 is a misuse box in which the magnitude of the metric required to indicate a vehicle misuse and inhibit the fire condition is reduced from that of the misuse box 184.

Figure 5:
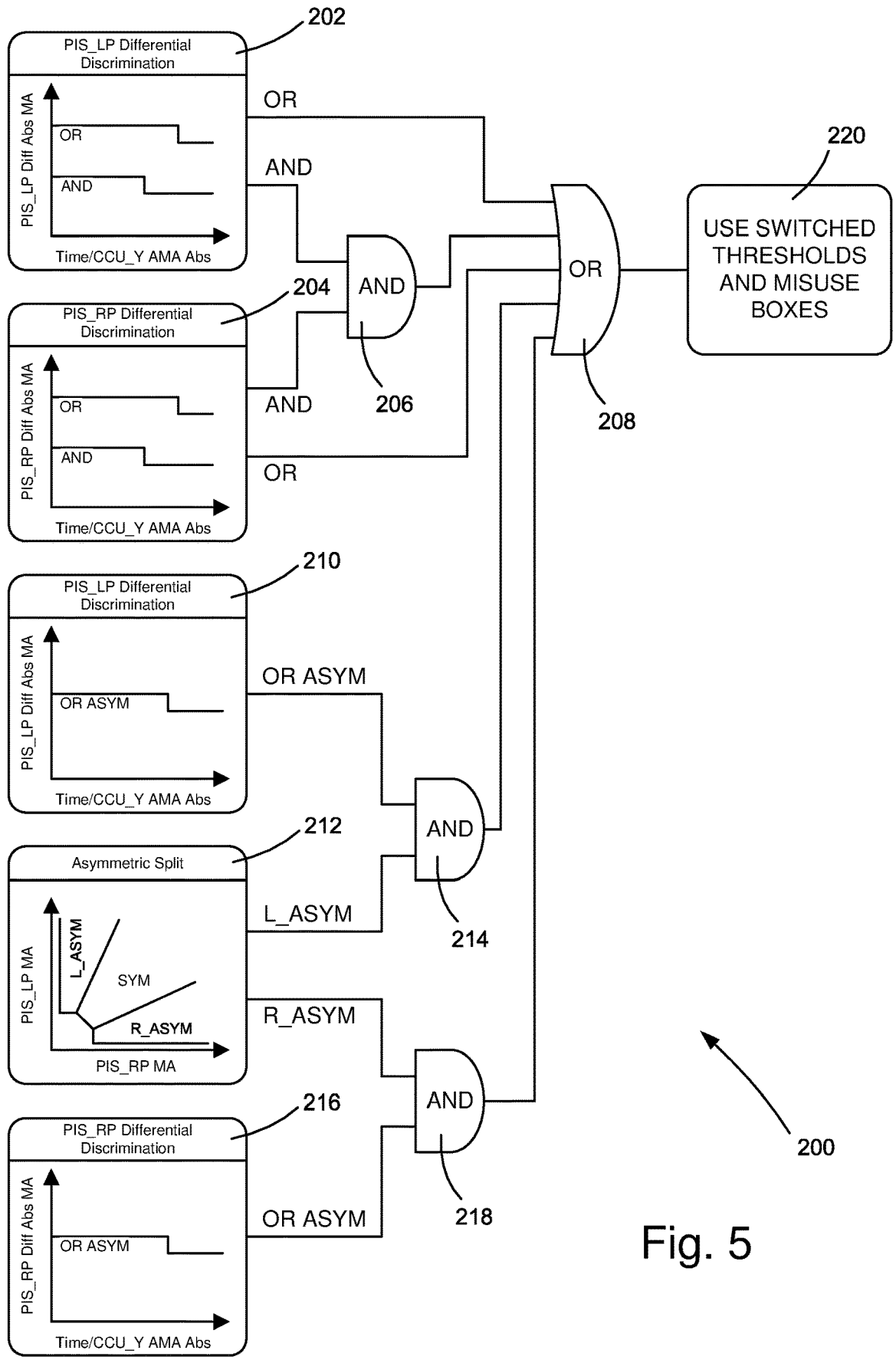
FIGS. 5-7 illustrate discrimination logic that can be implemented by the vehicle safety system.

According to one aspect of the invention, whether the determination and comparison function 170 implements the no-fire threshold 180 and misuse box 184 or is switched to the switched no-fire threshold 182 and switched misuse box 186 is determined in response to metrics derived from the pressure tube sensor 140. A PTS threshold switching algorithm 200 illustrating one example implementation of this is shown in FIG. 5. The PTS threshold switching algorithm 200 implements the PTS differential discrimination metric of FIG. 3C and the asymmetric split metric of FIG. 3B. As shown in FIG. 5, any of the conditions at OR block 208 being satisfied will trigger use of the switched no-fire threshold 182 and the switched misuse box 186 (see, FIG. 4), as indicated at 220. These conditions are set forth in the following paragraphs.

OR block 208 will be satisfied if the OR threshold of PIS_LP differential discrimination metric 202 is met. Here, the OR threshold is met when the PIS_LP Diff Abs MA crosses the OR threshold line of the metric 202. The OR threshold is indicative of high magnitude pressure differentials, which indicate a high pressure rate of change. Sensing this high pressure rate of change warrants use of the switched no-fire threshold 182 and the switched misuse box 186 (see, FIG. 4) and thereby can result in a quicker discrimination of a must-fire front impact event.

Similarly, OR block 208 will also be satisfied if the OR threshold of PIS_RP differential discrimination metric 204 is met. Here, the OR threshold is met when the PIS_RP Diff Abs MA crosses the OR threshold line of the metric 204. The OR threshold is indicative of high magnitude pressure differentials, which indicate a high pressure rate of change. Sensing this high pressure rate of change warrants use of the switched no-fire threshold 182 and the switched misuse box 186 (see, FIG. 4) and thereby can result in a quicker discrimination of a must-fire front impact event.

OR block 208 will also be satisfied if AND block 206 is satisfied. AND block 206 is satisfied when the AND thresholds of both the PIS_LP differential discrimination metric 202 and the PIS_RP differential discrimination metric 204 are met. The AND thresholds are met when the PIS_LP/RP Diff Abs MA crosses the AND threshold line of the respective metric 202, 204. The AND threshold is indicative of high magnitude pressure differentials, which indicate a high pressure rate of change. The magnitude of the AND threshold pressure differentials can be lower than the OR thresholds. Thus, both AND thresholds must be met to trigger switching. Both AND thresholds being met warrants use of the switched no-fire threshold 182 and the switched misuse box 186 (see, FIG. 4) and thereby can result in a quicker discrimination of a must-fire front impact event.

OR block 208 will also be satisfied if AND block 214 is satisfied. AND block 214 is satisfied when the OR ASYM threshold of the PIS_LP differential discrimination metric 210 is met and the asymmetric split metric 212 indicates a left asymmetric (L_ASYM) frontal impact. The OR ASYM threshold is met when the PIS_LP Diff Abs MA crosses the OR ASYM threshold line of the metric 210. The OR ASYM threshold is indicative of a high magnitude pressure differential, which indicates a high pressure rate of change. The magnitude of the OR ASYM threshold pressure differentials can be lower than the OR and the AND thresholds. Because of this, the OR ASYM is verified by the presence of the L_ASYM indication from the asymmetric split metric 212 at AND block 214. The L_ASYM is triggered when the phase shift between the PIS_LP MA and the PIS_RP MA indicates a left asymmetric frontal impact (see, FIG. 3B). The presence of the OR ASYM indication and the L_ASYM indications from metrics 210 and 212 met warrants use of the switched no-fire threshold 182 and the switched misuse box 186 (see, FIG. 4) and thereby can result in a quicker discrimination of a must-fire front impact event.

Similarly, OR block 208 will also be satisfied if AND block 218 is satisfied. AND block 218 is satisfied when the OR ASYM threshold of the PIS_RP differential discrimination metric 216 is met and the asymmetric split metric 212 indicates a right asymmetric (R_ASYM) frontal impact. The OR ASYM threshold is met when the PIS_RP Diff Abs MA crosses the OR ASYM threshold line of the metric 216. The OR ASYM threshold is indicative of a high magnitude pressure differential, which indicates a high pressure rate of change. The magnitude of the OR ASYM threshold pressure differentials can be lower than the OR and the AND thresholds. Because of this, the OR ASYM is verified by the presence of the R_ASYM indication from the asymmetric split metric 212 at AND block 218. The R_ASYM is triggered when the phase shift between the PIS_RP MA and the PIS_LP MA indicates a right asymmetric frontal impact (see, FIG. 3B). The presence of the OR ASYM indication and the R_ASYM indications from metrics 212 and 216 met warrants use of the switched no-fire threshold 182 and the switched misuse box 186 (see, FIG. 4) and thereby can result in a quicker discrimination of a must-fire front impact event.

From the above, it will be appreciated that the vehicle safety system 100 can implement control algorithms for determining when to actuate the safety devices 110. The control algorithms can implement metrics that utilize data from the pressure tube sensor 140 to improve the responsiveness of the system by realizing a quicker discrimination of certain types of front impacts by switching the no-fire thresholds and misuse boxes.

High Speed Rigid Barrier Detection

The early and quick discrimination facilitated by the PTS pressure data obtained from the pressure tube sensor 140 also allows for early detection of a high speed rigid barrier frontal impact. The high speed rigid barrier can, for example, be a frontal impact commensurate with 56 kph rigid barrier criteria (e.g., US-NCAP standards).

Figure 6:
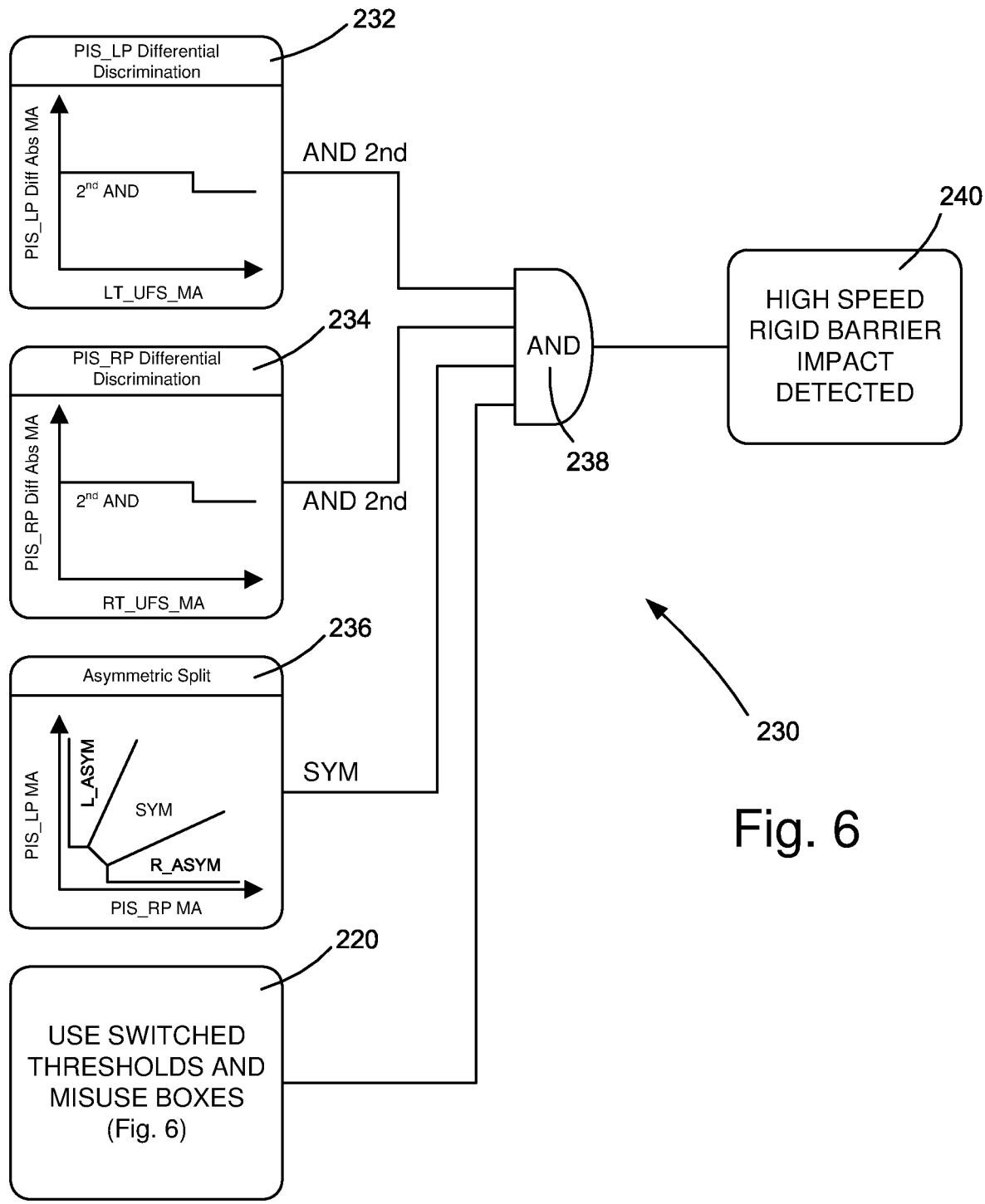

A high speed rigid barrier impact detection algorithm 230 is illustrated in FIG. 6. The high speed rigid barrier impact detection algorithm 230 implements the PTS differential discrimination metric of FIG. 3C, the asymmetric split metric of FIG. 3B, and use switched thresholds and misuse boxes indication 220 of FIG. 5. As shown in FIG. 6, all of the conditions at AND block 238 being satisfied will trigger a high speed rigid barrier detected block 240. These conditions are set forth in the following paragraphs.

AND block 238 will be satisfied if:
- The $2^{nd}$ AND threshold of PIS_LP differential discrimination metric 232 is met.
- The $2^{nd}$ AND threshold of PIS_RP differential discrimination metric 234 is met.
- Asymmetric split metric 236 indicates a symmetric (SYM) frontal impact.
- The use switched thresholds and misuse boxes block 220 (see, FIG. 5) is satisfied.

The use switched thresholds and misuse boxes block 220 being satisfied indicates that at least one of the conditions at OR block 208 is satisfied. As described above in regard to FIG. 5, the conditions that give rise to the use switched thresholds and misuse boxes block 220 being satisfied are based on pressures sensed via the pressure tube sensor 140.

Utilizing the pressure tube sensor 140 is beneficial in the early discrimination of frontal vehicle collisions, especially high-speed frontal vehicle collisions, because the sensor is physically located at the very front of the vehicle where the impact occurs. Because of this, the pressure tube sensor 140 is extremely quick to respond to vehicle deformation resulting from the collision, and can therefore provide a quick and reliable indication of a frontal vehicle collision prior to other sensors, such as accelerometers.

The PIS_LP/RP differential discrimination metrics 232, 234 compare PIS_LP Diff Abs MA and the PIS_RP Diff Abs MA with LT_UFS_MA and RT_UFS_MA, respectively. LT_UFS_MA and RT_UFS_MA are moving average acceleration values measured via the left upfront sensor 146 and the right upfront sensor 148, respectively. The $2^{nd}$ AND thresholds of the PIS_LP/RP differential discrimination metrics 232, 234 are met when both the PIS_LP Diff Abs MA and the PIS_RP Diff Abs MA cross their respective $2^{nd}$ AND threshold lines of metrics 232 and 234.

The $2^{nd}$ AND thresholds are indicative of high magnitude pressure differentials, which indicate a high pressure rate of change associated with a high speed rigid barrier frontal impact. The SYM indication from the asymmetric split metric 236 indicates a symmetric front impact. Sensing the high pressure rates of change at the front-left and front-right of the vehicle (via the PIS_LP/RP Differential Discrimination metrics 232 and 234) and having them verified as symmetrical by the SYM indication from asymmetric split metric 236 warrants the indication at block 240 that a high speed rigid barrier impact is detected.

From the above, it will be appreciated that the vehicle safety system 100 can implement control algorithms for determining when to actuate the safety devices 110. The control algorithms can implement metrics that utilize data from the pressure tube sensor 140 to improve the responsiveness of the system by realizing a quicker discrimination of high speed rigid barrier front impacts.

High Voltage (HV) Deactivation

The early and quick discrimination facilitated by the PTS pressure data obtained from the pressure tube sensor 140 also allows for early detection of a frontal impact for which deactivation of the electrical system in high voltage (HV) vehicles is warranted. As used herein, HV vehicles can include electric vehicles, hybrid vehicles, or any other vehicle equipped with a high voltage installation. HV deactivation can, for example, cutting off or isolating the vehicle battery from the remainder of the vehicle by, for instance, tripping a switch or circuit breaker.

Figure 7:
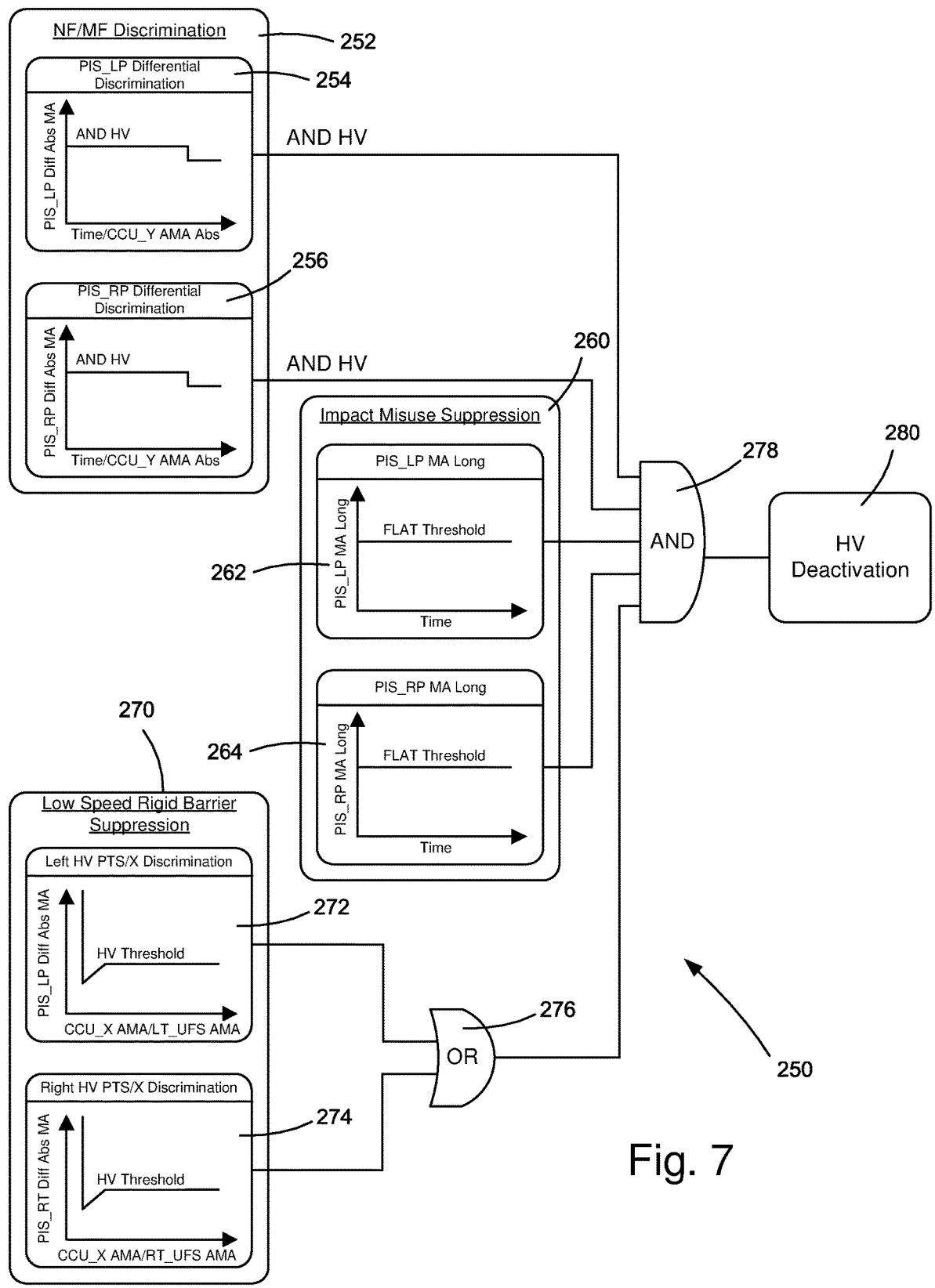

An HV deactivation algorithm 250 is illustrated in FIG. 7. The HV deactivation algorithm 250 implements a no-fire/must-fire (NF/MF) discrimination metric 252, an impact misuse suppression discrimination metric 260, and a low-speed rigid barrier suppression discrimination metric 270. As shown in FIG. 7, all of the conditions at AND block 278 being satisfied will trigger an HV deactivation block 280. The conditions at AND block 278 are determined by the discrimination metrics 252, 260, and 270. These conditions are set forth in the following paragraphs.

NF/MF discrimination metric 252 determines whether PIS_LP/RP differential discrimination metrics 254, 256 indicate that both the PIS_LP Diff Abs MA and the PIS_RP Diff Abs MA cross their respective AND HV threshold lines. The AND HV thresholds are indicative of high magnitude pressure differentials, which indicate a high pressure rate of change associated with HV deactivation. The AND HV thresholds of both differential discrimination metrics 254 and 256 must be met in order to trigger AND block 278 and HV deactivation block 280.

Impact misuse suppression discrimination metric 260 determines vehicle misuse for which HV deactivation may be desired. As shown, the impact misuse suppression discrimination metric 260 includes a metric 262 that monitors PIS_LP MA Long over time, and a metric 264 that monitors PIS_RP MA Long over time. Both metrics 262 and 264 include a flat threshold triggered when the respective PIS_LP/RP MA Long value exceeds a predetermined threshold value. The flat thresholds of both metrics 262 and 264 must be met in order to trigger AND block 278 and HV deactivation block 280.

Low-speed rigid barrier suppression discrimination metric 270 determines rigid barrier impact for which HV deactivation may be desired. The rigid barrier suppression discrimination can, for example, discriminate a frontal impact commensurate with 27 kph rigid barrier criteria (e.g., US-NCAP standards). As shown, the rigid barrier suppression discrimination metric 270 includes a left HV PTS/X discrimination metric 272 and a right HV PTS/X discrimination metric 274. Each of these metrics compares PIS_LP Diff Abs MA against either CCU_X AMA or LT/RT_UFS AMA. The HV thresholds of either metrics 272 and 274 must be met (see, OR block 276) in order to trigger AND block 278 and HV deactivation block 280.

From the above, it will be appreciated that the vehicle safety system 100 can implement control algorithms for determining when to actuate the safety devices 110. The control algorithms can implement metrics that utilize data from the pressure tube sensor 140 to improve the responsiveness of the system by realizing a quicker discrimination of HV deactivation events.

From the above description of the invention, those skilled in the art will perceive improvements, changes and modifications. For example, the figures illustrate various metrics that can be implemented in the disclosed vehicle safety system. The thresholds illustrated in these metrics, i.e., the shape of the lines identifying the thresholds, is by way of example only. Those skilled in the art will appreciate that the characteristics of these metrics, i.e., the shapes of the lines identifying the thresholds, can vary depending on a variety of factors, such as the configuration of the particular vehicle in which the safety system is implemented and the design criteria under which the safety system is designed. Such Having described the invention, the following is claimed:

1. A method for controlling an actuatable safety device for helping to protect a vehicle occupant, the method comprising:
   sensing left-front and right-front pressure values via a pressure tube sensor;
   executing pressure tube metrics that evaluate the left-front and right-front pressure values;
   selecting switched crash thresholds in response to the pressure tube metrics;
   sensing vehicle acceleration parameters;
   executing one or more crash metrics that evaluate the vehicle acceleration parameters to determine whether the switched crash thresholds are exceeded; and
   controlling deployment of the actuatable safety device in response to determining that the switched crash thresholds are exceeded,
   wherein the pressure tube metrics comprise at least one of pressure tube sensor differential discrimination metrics and pressure tube sensor asymmetric split metrics, and wherein the pressure tube sensor differential discrimination metric evaluates a front pressure differential moving average absolute value against an upfront sensor acceleration moving average.

2. The method recited in claim 1, wherein the switched crash thresholds comprise no-fire thresholds and misuse boxes.

3. The method recited in claim 1, wherein the pressure tube sensor differential discrimination metrics evaluate a rate of change in at least one of the left-front and right-front pressure values.

4. The method recited in claim 1, wherein the pressure tube asymmetric split metrics evaluate a front-left pressure moving average against a front-right pressure moving average.

5. The method recited in claim 1, wherein selecting switched crash thresholds in response to the pressure tube metrics comprises selecting the switched crash thresholds in response to at least one of:
   the pressure tube sensor differential discrimination metric for either of the left-front and right-front pressure values exceeding an OR threshold;
   the pressure tube sensor differential discrimination metric for both the left-front and right-front pressure values exceeding an AND threshold, wherein the AND threshold has a magnitude that is less than a magnitude of the OR threshold;
   the pressure tube sensor differential discrimination metric for the left-front pressure value exceeding an OR ASYM threshold and the pressure tube asymmetric split metric indicates an asymmetric-left front impact;
   the pressure tube sensor differential discrimination metric for the right-front pressure value exceeding an OR ASYM threshold and the pressure tube asymmetric split metric indicates an asymmetric-right front impact.

6. A vehicle safety system comprising:
   one or more vehicle safety devices; and
   a controller configured to execute the method recited in claim 1 and to actuate the one or more vehicle safety devices in response thereto.

7. The vehicle safety system recited in claim 6, further comprising:
   a pressure tube sensor (PTS) configured to be mounted at the front of the vehicle; and
   an airbag control unit (ACU) configured to be mounted in an instrument panel of the vehicle, wherein the controller is implemented in the airbag control unit, and wherein the pressure tube sensor is configured to communicate with the ACU.

8. The vehicle safety system recited in claim 6, wherein the one or more vehicle safety devices comprise at least one of a frontal airbag and a seatbelt pretensioner.

9. The vehicle safety system recited in claim 7, further comprising a left upfront sensor (LT_UFS) configured to be mounted at a front-left corner of the vehicle, and a right upfront sensor (RT_UFS) configured to be mounted at a front-right corner of the vehicle, wherein the left upfront sensor and right upfront sensor are configured to communicate with the ACU.

10. A method for controlling an actuatable safety device for helping to protect a vehicle occupant, the method comprising:
    sensing left-front and right-front pressure values via a pressure tube sensor;
    executing pressure tube metrics that evaluate the left-front and right-front pressure values;
    selecting switched crash thresholds in response to the pressure tube metrics;
    sensing vehicle acceleration parameters;
    executing one or more crash metrics that evaluate the vehicle acceleration parameters to determine whether the switched crash thresholds are exceeded; and
    controlling deployment of the actuatable safety device in response to determining that the switched crash thresholds are exceeded wherein the pressure tube metrics comprise at least one of pressure tube sensor differential discrimination metrics and pressure tube sensor asymmetric split metrics, the method further comprising determining the occurrence of a high speed rigid barrier collision in response to:
    selecting switched crash thresholds in response to the pressure tube metrics; and
    the pressure tube sensor differential discrimination metric for both the left-front and right-front pressure values exceeding a 2nd AND threshold; and
    the pressure tube asymmetric split metric indicates an symmetric front impact.

11. A method for controlling an actuatable safety device for helping to protect a vehicle occupant, the method comprising:
    sensing left-front and right-front pressure values via a pressure tube sensor;
    executing pressure tube metrics that evaluate the left-front and right-front pressure values;
    selecting switched crash thresholds in response to the pressure tube metrics;
    sensing vehicle acceleration parameters;
    executing one or more crash metrics that evaluate the vehicle acceleration parameters to determine whether the switched crash thresholds are exceeded; and
    controlling deployment of the actuatable safety device in response to determining that the switched crash thresholds are exceeded
    wherein the pressure tube metrics comprise at least one of pressure tube sensor differential discrimination metrics and pressure tube sensor asymmetric split metrics, and wherein the vehicle is an electric vehicle, hybrid vehicle or vehicle equipped with high voltage installation and the method further comprises deactivating a high-voltage connection in response to:

the pressure tube sensor differential discrimination metric for both the left-front and right-front pressure values exceeding an AND HV threshold; and a long moving average metric for both the left-front and right-front pressure values exceeds a FLAT threshold; and at least one of a left low speed rigid barrier suppression metric and a right low speed rigid barrier suppression metric exceeds an HV threshold.

12. The method recited in claim 11, wherein:
the left low speed rigid barrier suppression metric comprises a left pressure tube sensor differential discrimination metric that evaluates a front-left pressure differential moving average absolute value against one of a CCU X-axis acceleration moving average and an acceleration value obtained from a left up-front acceleration sensor; and the right low speed rigid barrier suppression metric comprises a right pressure tube sensor differential discrimination metric that evaluates a front-right pressure differential moving average absolute value against one of a CCU X-axis acceleration moving average and an acceleration value obtained from a right up-front acceleration sensor.

13. A method for controlling an actuatable safety device for helping to protect a vehicle occupant, the method comprising:
sensing left-front and right-front pressure values via a pressure tube sensor;
executing pressure tube metrics that evaluate the left-front and right-front pressure values;
selecting switched crash thresholds in response to the pressure tube metrics;
sensing vehicle acceleration parameters;
executing one or more crash metrics that evaluate the vehicle acceleration parameters to determine whether the switched crash thresholds are exceeded; and
controlling deployment of the actuatable safety device in response to determining that the switched crash thresholds are exceeded
wherein the pressure tube metrics comprise at least one of pressure tube sensor differential discrimination metrics and pressure tube sensor asymmetric split metrics, and wherein the pressure tube asymmetric split metrics evaluate a phase shift in the left-front and right-front pressure values to determine whether a front impact is symmetric, asymmetric-left, or asymmetric-right.

14. A vehicle safety system comprising:
one or more vehicle safety devices; and
a controller configured to execute the method recited in claim 13 and to actuate the one or more vehicle safety devices in response thereto.

15. The vehicle safety system recited in claim 14, further comprising:
a pressure tube sensor (PTS) configured to be mounted at the front of the vehicle; and
an airbag control unit (ACU) configured to be mounted in an instrument panel of the vehicle, wherein the controller is implemented in the airbag control unit, and wherein the pressure tube sensor is configured to communicate with the ACU.

16. The vehicle safety system recited in claim 15, further comprising a left upfront sensor (LT_UFS) configured to be mounted at a front-left corner of the vehicle, and a right upfront sensor (RT_UFS) configured to be mounted at a front-right corner of the vehicle, wherein the left upfront sensor and right upfront sensor are configured to communicate with the ACU.

17. The vehicle safety system recited in claim 16, wherein the one or more vehicle safety devices comprise at least one of a frontal airbag and a seatbelt pretensioner.

18. The method recited in claim 13, wherein the switched crash thresholds comprise no-fire thresholds and misuse boxes.

19. The method recited in claim 13, wherein the pressure tube sensor differential discrimination metrics evaluate a rate of change in at least one of the left-front and right-front pressure values.

20. The method recited in claim 13, wherein the pressure tube asymmetric split metrics evaluate a front-left pressure moving average against a front-right pressure moving average.

21. The method recited in claim 13, wherein selecting switched crash thresholds in response to the pressure tube metrics comprises selecting the switched crash thresholds in response to at least one of:
the pressure tube sensor differential discrimination metric for either of the left-front and right-front pressure values exceeding an OR threshold;
the pressure tube sensor differential discrimination metric for both the left-front and right-front pressure values exceeding an AND threshold, wherein the AND threshold has a magnitude that is less than a magnitude of the OR threshold;
the pressure tube sensor differential discrimination metric for the left-front pressure value exceeding an OR ASYM threshold and the pressure tube asymmetric split metric indicates an asymmetric-left front impact;
the pressure tube sensor differential discrimination metric for the right-front pressure value exceeding an OR ASYM threshold and the pressure tube asymmetric split metric indicates an asymmetric-right front impact.

* * * * *